United States Patent [19]
Pickering

[11] Patent Number: 5,483,445
[45] Date of Patent: Jan. 9, 1996

[54] AUTOMATED BILLING CONSOLIDATION SYSTEM AND METHOD

[75] Inventor: Richard E. Pickering, New York, N.Y.

[73] Assignee: American Express TRS, New York, N.Y.

[21] Appl. No.: 140,607

[22] Filed: Oct. 21, 1993

Related U.S. Application Data

[63] Continuation-in-part of Ser. No. 964,922, Oct. 22, 1992, abandoned.

[51] Int. Cl.$^6$ .................................................. G06F 17/60
[52] U.S. Cl. ........................... 364/406; 364/401; 364/402
[58] Field of Search .................................... 364/408, 406, 364/401, 402

[56] References Cited

U.S. PATENT DOCUMENTS

| | | | |
|---|---|---|---|
| 5,220,501 | 6/1993 | Lawlor et al. | 364/408 |
| 5,283,829 | 2/1994 | Anderson | 380/24 |
| 5,326,959 | 7/1994 | Perazza | 235/379 |

OTHER PUBLICATIONS

Citi–One Telephone Bill Payment, Jan., 1992.
Chase Pay By Phone—1991.
Tell Your Money Where To Go—1992.
Smart Phone—Jan. 28, 1991.
Enhanced Telephone—1990.
Direct Access—1989.
BillPay USA—1992.
Wells Fargo Automatic Payment.
A Renewed VISA.
Karen Gullo, BankAmerica, Safeway Joining to Offer Shop–at–Home Service, American Banker, Nov. 27, 1991.
Eben Shapiro, Phones Getting Smarter with Built–In Computer, New York Times, Apr. 17, 1991.
John J. Keller, SmartPhone Has Milestone: First Customer Wall Street Journal, Mar. 19, 1991.
Jeanne Iida, TV Answer, CheckFree in Bill Payment Pact, American Banker, Jun. 12, 1992.
MCI Announced A New Billing Arrangement.
Synergistics Research Corporation, FOCUS Series, Jul., 1992.
Richard Layne, Citibank Is Planning to Launch Phone Banking Service in Mar., American Banker, Oct. 11, 1990.
Karen Gullo, More Companies To Offer Phone Banking Devices The Los Angeles Times, Aug. 21, 1990.
Karen Gullo, Banks Rush to Develop Home Banking Over Telephones, The Reuter Business Report, Jul. 18, 1990.
Karen Gullo, Bank–by–Phone Competition Rising, American Banker, Jul. 16, 1990.
Karen Gullo, Citicorp Piqued at Vendor as Rival American Banker, Apr. 13, 1990.
Michael Quint, Consumer's World: Bills to Pay? The New York Times, Mar. 3, 1990.
Miscellaneous Computer Listings.

(List continued on next page.)

*Primary Examiner*—Robert A. Weinhardt
*Assistant Examiner*—Stephen R. Tkacs
*Attorney, Agent, or Firm*—Michael K. Kelly; Snell & Wilmer

[57] ABSTRACT

An automated system and method for consolidating a plurality of individual company charges for a customer with different periodic company billing and payment due dates is provided. Under the system, companies and businesses such as utility companies report their periodic billing information to a central processing office or facility. This is completed by electronic or magnetic data transfer. The processing office undergoes minimization processing and holds the billing information data in time suspense until all of the billing information for the customer during a pre-selected time period is received. Then, the central processing facility generates a single customer statement which identifies all individual company charges as well as a statement due date. The statement is sent to the customer and payment for the identified charges is due by the statement due date. After receiving payment from the customer, the centralized billing center processes the payment and then remits payment to all of the companies.

30 Claims, 7 Drawing Sheets

U.S. PATENT DOCUMENTS

Fraser; "Account–Ability"; *Inc.*; v13 n3; pp. 72–78; Mar. 1991; Dialog: File 15, Acc #00538528.

"Norway: TRW Sells Image Processing System to Norwegian Clearing House"; *American Banker;* Nov. 16, 1988; p. 9; Dialog: File 771, Acc #04509594.

"CINCOM Announces Accounts Payable Module"; Dateline: Cincinnati, Ohio; Jul. 1985; Dialog: File 621, Acc #103704.

Briere et al.; "Footing the Bill"; *Network World;* v9 n21; pp. 32–34; May 25, 1992; Dialog: File 15, Acc #00616623.

McCord; "How Can You Prevent Collection Woes?"; *Ophthalmology Times;* Oct. 15, 1992; p. 38; Dialog: File 16, Acc #04132471.

Malm; "Domestic Transfers in Sweden—Efficiency Through Competition and Cooperation (Part 1 of 2)"; *Banker International;* C/c 8/89; Aug., 1987; Dialog: File 771, Acc #01983919.

"New Electronic Payment System Brings Utility Customers Into 'Checkless Society'"; *News Release;* Feb. 20, 1990; p. 1; Dialog: File 16, Acc #02504853.

White; "Consumer Bill Paying Services in the Evolving Electronic Funds Transfer Environment"; *Magazine of Bank Administration;* v53 n11; pp. 38–43; Nov. 1977; Dialog: File 15, Acc #00064668.

Hager; "The Swedish Postal Giro and Its Progress"; *Journal of Bank Research;* v16 n4; pp. 227–231; 1986; Dialog: File 15, Acc #00323385.

Summary Of Account

FIG. 7

PLEASE RETAIN THIS PORTION FOR YOUR FILES.

| CUSTOMER NAME | REFERENCE NUMBER | PAYMENT DUE DATE |
|---|---|---|
| T.H. SAMPLEMAN | 2300-11-23444-44444 | 2-15-92 |

| COMPANY ACCOUNT NUMBER<br>CUSTOMER SERVICE NUMBER | SERVICE PERIOD | PREVIOUS BALANCE | AMOUNT PAID | AMOUNT DUE |
|---|---|---|---|---|
| US ELECTRIC COMPANY<br>65-5088-5555-0000-0<br>1-800-555-8695 | 04-05-93<br>05-03-93 | $ 75.43 | $75.43 | $ 76.92 |
| AMERICAN GAS COMPANY<br>03432-41000<br>1-800-555-8245 | 03-13-93<br>05-08-93 | 53.68 | 53.68 | 42.54 |
| CABLE COMPANY<br>25306-125<br>1-800-555-7604 | 06-08-93<br>07-07-93 | 35.00 | 35.00 | 35.00 |
| GENERAL WATER SUPPLY<br>96875-09-3<br>1-800-555-8794 | 04-11-93<br>05-10-93 | 27.06 | 27.06 | 28.30 |
| BELL TELEPHONE COMPANY<br>205 999 1241 845 222<br>1-800-555-2416 | 04-22-93<br>05-22-93 | 43.20 | 29.40 | 63.53 |
| AT&T<br>205 999 1214 845 222<br>1-800-555-0004 | 04-22-93<br>05-21-93 | 26.85 | 26.85 | 25.42 |
| TOTAL | | $261.22 | $247.42 | $285.51 |

PLASE PAY THIS AMOUNT

IMPORTANT MESSAGE: PAY — — — — — — — —
— — — — — — — — — — — — — —
— — — — — — — — — — — — —

Statement Of Account

PLEASE ENTER — — — — — — —
— — — — — — —

| | REFERENCE NUMBER | TOTAL AMOUNT DUE |
|---|---|---|
| | 2300-11-23444-44444 | $285.51 |

T.H. SAMPLEMAN
543 MAIN STREET
YOUR TOWN, USA 11201

PROCESSING CENTER
P.O. BOX 1270
FLAGSTAFF, AZ 07101-1270

☐ CHECK HERE — — — — — — — — — — — — — —
— — — —

AUTOMATED BILLING CONSOLIDATION SYSTEM AND METHOD

CROSS REFERENCE TO RELATED APPLICATIONS

This is a continuation-in-part of application Ser. No. 07/964,922, now abandoned, filed on Oct. 22, 1992.

BACKGROUND OF THE INVENTION

This invention relates to an automated system for consolidating a plurality of individual charges for a consumer, and more particularly, to a system for consolidating a plurality of individual customer charges from a plurality of companies which have different periodic customer billing dates and different payment due dates.

Normally, the customer or consumer receives several if not numerous individual bills or invoices from companies such as utilities during a single month or single time period. However, customer billing dates for several companies and utilities vary. For most utilities, including those which require a meter reading, bills are usually mailed within a day of the individual utility company meter reading. Thus, a consumer or customer's bills are cut, mailed and ultimately due on varying dates during the month or billing cycle.

For many customers, remittance of payment for the charges identified in the bills or invoices is a time consuming and burdensome task. For each remittance payment, the customer must typically fill out the remittance stub, write an individual check to the company or utility for the amount owed, and mail the stub and check to the company or utility in order to meet the payment deadline.

In addition, because monthly or periodic billing cycles for companies and utilities are not synchronized, the task of payment by the customer may not usually be done at a single sitting. Rather, the customer must process and remit payment to the various companies several times during the month or cycle. This of course is an inefficient system for payment remittance.

Moreover, for a customer who pays a large number of company payments during a month or billing cycle, the postage costs to remit payment can add up to a significant dollar amount.

A possible solution to the above problems is to develop a consolidated billing and payment system. This would provide the customer or consumer with a convenient, simple and time and money saving bill payment method. However, the development of such a system is not easily achieved.

Accordingly, it would be desirable to provide a consolidated billing and payment system for charges to a consumer from companies with different periodic billing and payment due dates.

SUMMARY OF THE INVENTION

Generally speaking, in accordance with the invention, an automated system for consolidating a plurality of individual company charges for a customer with different periodic company billing and payment due dates is described. Under the system, companies and businesses such as utilities report their periodic billing information to a central processing office or facility. The processing office or facility holds the billing information data in time suspense until all of the billing information for the customer during a pre-selected time period is received. Then, the central processing facility generates a single customer statement which identifies all individual charges as well as a statement due date. The statement is sent to the customer and payment for the identified charges is due by the statement due date. After receiving payment from the customer, the centralized billing facility processes the payment and then remits payment to all of the companies.

Significantly, under the system, all company bills are effectively due for payment at the same time (the common customer billing date). As a result, at least some of the companies may receive payment later than they otherwise would if they handled the billing and remittance themselves. Because of this delay (the "float" period), each of the companies would lose monetary interest based on the time difference between the consolidated statement due date and the individual company payment due date. Accordingly, as part of the system and in order to encourage companies to consider joining the consolidated program, the central processing facility will compensate each company for the monetary interest lost due to this time difference in payment dates.

As part of the system, a single periodic customer billing date for the charges incurred by the customer from the selected companies is chosen. This is achieved by analyzing historical customer billing data that is reported to the central processing office by each of the companies and then calculating an optimal single periodic billing date which minimizes the overall compensation required between the companies and financial institution.

Because a central processing office or facility is used, there may be a further delay in remitting payment to each of the companies after receiving payment from the customer. Consequently, the financial firm which monitors the billing system may also elect to enhance the compensatory payment to the companies in order to compensate for this delay.

Once the system is in place, the central processing facility may evaluate the payment behavior patterns of the customer after receiving customer payments over a given time period. Based on this evaluation, the central processing facility will determine whether the customer is paying more or less promptly than he or she was doing when paying the companies on an individual basis. Depending upon this determination, the central processing facility will periodically adjust the compensatory payment to each of the companies in order to reflect the payment patterns of the customer.

Finally, the central processing facility can generate annual summary statements of individual customer's expenditures for facilitating tax preparation or preparing budgets.

Accordingly, it is an object of this invention to consolidate a plurality of individual company and utility charges for a customer into a single periodic customer invoice or statement.

Still another object of the invention is to provide a consolidated billing system for the payment of utility and company charges which reduce billing costs to the individual companies and businesses.

A further object of the invention is to reduce the time and expense of the customer in transmitting periodic payments of business and company charges.

Still another object of the invention is to provide monthly and yearly summary statements of utility and company expenditures incurred by a customer.

Yet a further object of the invention is to facilitate collection of company and utility charges from a customer.

Still other objects and advantages of the invention will in part be obvious and will in part be apparent from the following specification.

The invention accordingly comprises the several steps and the relation of one or more of these steps with respect to each of the others, and the system embodying the features of construction, combination of elements and arrangement of components which are adapted to effect such steps, all as exemplified in the following detailed disclosure, and the scope of the invention will be indicated in the claims.

BRIEF DESCRIPTION OF THE DRAWINGS

For a fuller understanding of the invention, reference is made to the following description, taken in connection with the accompanying drawings, in which:

FIG. 7 is a schematic view of a periodic customer statement which is generated in accordance with the system of the present invention.

DETAILED DESCRIPTION

In order to implement the consolidated billing system of the present invention, a financial firm or charge card company such as the assignee, American Express Company, sets up a central or regional processing center or facility. As an example, the system may be used for consolidating the billing of utility companies such as the gas company, the electric company, the cable TV company, the telephone company (including long distance and local billing), the water company, the oil company and the sanitation company—all companies normally providing bills at regular intervals. Other companies may be added to the system as it expands.

The companies or utilities are notified of the consolidated billing system by the financial firm through a sales force, marketing and/or promotional materials as is well known in the art. If a company such as a utility is interested in participating in the program, an examination is made of the utilities' data processing compatibility/data transmission processes and subsequently a data link will be developed between the central processing center and the utility.

The next step in setting up the consolidated system is enrolling specific customers. Customers may be sent brochures or utility bill inserts regarding the consolidated billing system in each of their monthly bills from the companies and utilities participating in the program. Alternatively, media advertisements on TV and radio or in the newspapers may be used. If a customer is interested in participating in the program, the customer contacts the financial firm and provides information regarding which company or utility bills should be included, as well as personal information such as name, address and social security number. Once this information is processed by the financial firm, the customer is enrolled in the system. The data flow associated with the enrollment process is clearly shown in FIG. 2.

Figure 1:
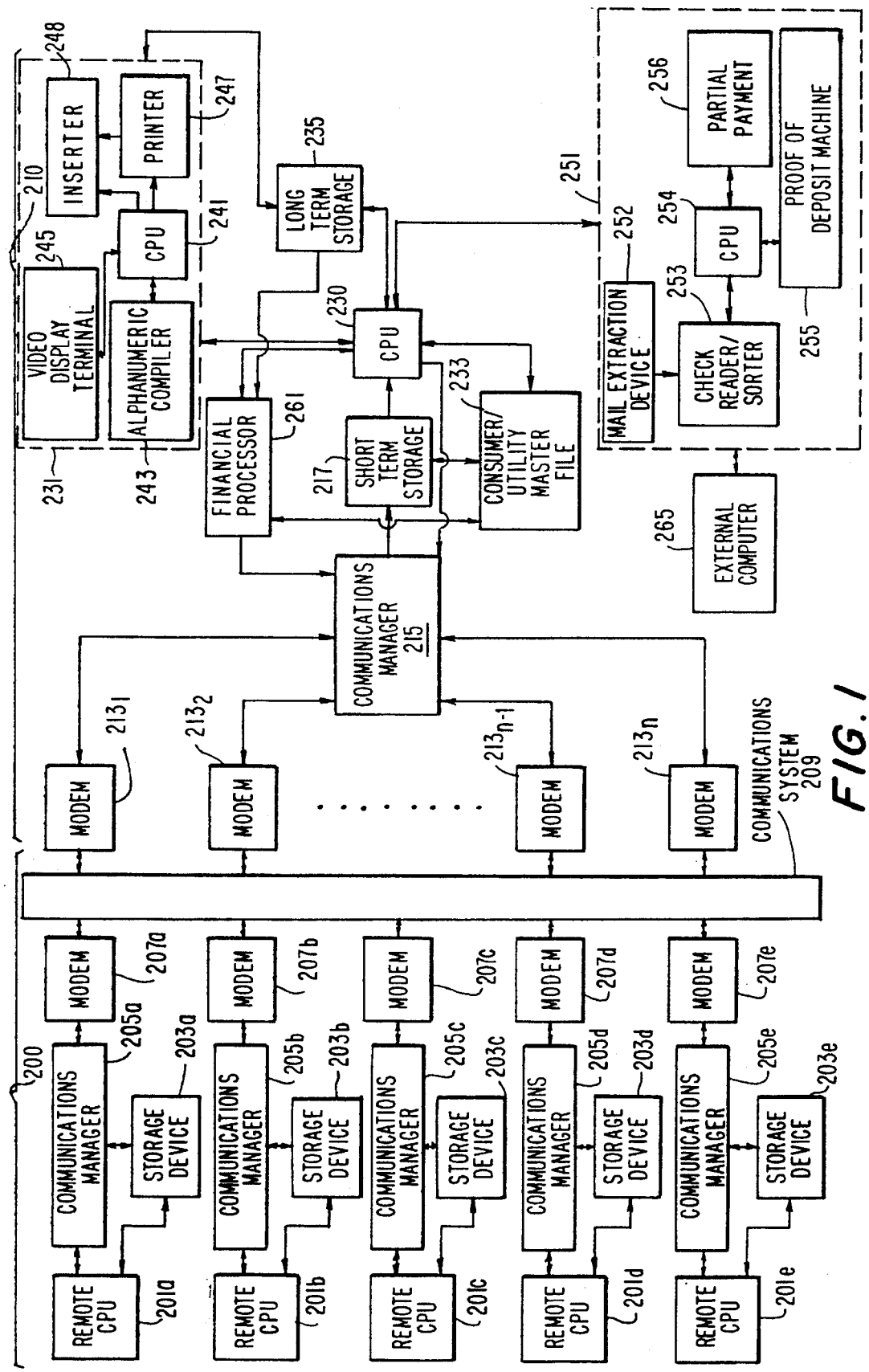
FIG. 1 is a diagram illustrating the combination of elements embodied in a first preferred embodiment of the invention.

Reference is now made to FIG. 1, wherein a block diagram illustrating the combination of elements embodied in the preferred embodiment of the invention is disclosed. A plurality of remote CPUs $201a-e$ are operated out of each of the utilities described above. CPUs $201a-e$ are each coupled to a storage device $203a-e$ respectively. The storage devices $203a-e$ include conventional computer memory such as RAM and ROM chips, as well as long term memory, such as hard discs, CD ROM and tape memory. Communications managers $205a-e$ are each coupled to remote CPUs $201a-e$ and storage devices $203a-e$, respectively and are responsible for communicating the information stored in the respective storage devices $203a-e$ to the financial institution computer system, generally indicated at 210. In the preferred embodiment, this is achieved by transferring information from communications managers $205a-e$ through modems $207a-e$ coupled to communications managers $205a-e$. The information is then transferred through a communications system 209. In an exemplary embodiment, communications system 209 comprises a series of telephone lines.

Still referring to FIG. 1, communications system 209 connects the remote or utility computer systems generally indicated at 200, with financial institution computer system 210. Financial institution computer system 210 receives information from remote CPUs $201a-201e$ through communications system 209. Modems $213_1-213_n$ are electrically coupled to communications system 209 and are also electrically coupled to communications manager 215. As a result, information is transferred from communications system 209 through modems $213_1-213_n$ to communications manager 215.

Communications manager 215 is electrically coupled to a short term storage device 217. Short term storage device 217 is, for example, RAM, PROM and/or may also include disc memory for temporarily storing information received from remote or utilities computer system 300 through communications system 209. Short term storage device 217 is also electrically coupled to CPU 230, such that CPU 230 receives the information from communications system 209.

CPU 230 is the center of financial institution computer system 210. CPU 230 is electrically coupled to statement compiler 231. Statement compiler 231 includes a CPU 241 coupled to an alphanumeric compiler 243, video display terminal 245, printer 247 and inserter 248. Statement compiler 231 is responsible for receiving information from CPU 230 and producing individual statements for each consumer or customer. Video display terminal 245 is provided for an operator to input or interface with statement compiler 231. Printer 247 prints out the statements and inserter 248 automatically inserts the statement into an envelope. CPU 230 provides information to the statement compiler 231 to produce the individual statements by transmitting information from consumer/utility master file 233, long term storage device 235 and short term storage device 217 as shown in FIG. 1.

After the consumer or customer makes a payment, whether in whole or in part, the payment information is input into remittance processing 251. Remittance processing 251 includes an mail extraction device 252 such as an agissar coupled to a check reader sorter 253 which is coupled to CPU 254. CPU 254 is also coupled to proof of deposit machine 255 and partial payment 256. Remittance processing 251 is electrically coupled to CPU 230. As payment is received in the financial institution, agissar 252 opens the envelopes and outputs the contents to check reader/sorter 253. CPU 254 receives the payment information from check reader/sorter 253 and interacts with proof of deposit machine 255 to verify payment. when partial payment is received CPU 254 downloads the payment information to partial payment 256. The updated account information is electrically transferred from remittance processing 251 to CPU 230.

Alternatively, remittance processing 251 is coupled to external computer 265 in order to receive or transmit computerized payment such as by wire transfer. Computerized payment eliminates the need for a mail extractor, such as mail extraction device 252, check reader/sorter 253 and proof of deposit machine 255; however, the remainder of remittance processing 251 operates the same. CPU 230 then transfers account information to consumer/utility master file 233 and long term storage device 235.

CPU 230 can also communicate back to remote CPUs 201a–201e. In the most simple form, CPU 230 can be in direct communication with communications manager 215. Alternatively, communication can be achieved by CPU 230 outputting individual account information to financial processor 261. Financial processor 261 receives information from CPU 230, long term storage 235 and consumer/utility master file 233, and then calculates the amount of payment of individual bills.

Financial processor 261 is coupled to communications manager 215. Communications manager 215 communicates with modems $213_1$–$213_n$, which in turn communicate with modems 207a–207e through communications system 209. The information is then transferred through communications managers 205a–e to remote CPUs 201a–e for storage in storage devices 203a–203e.

Figure 2:
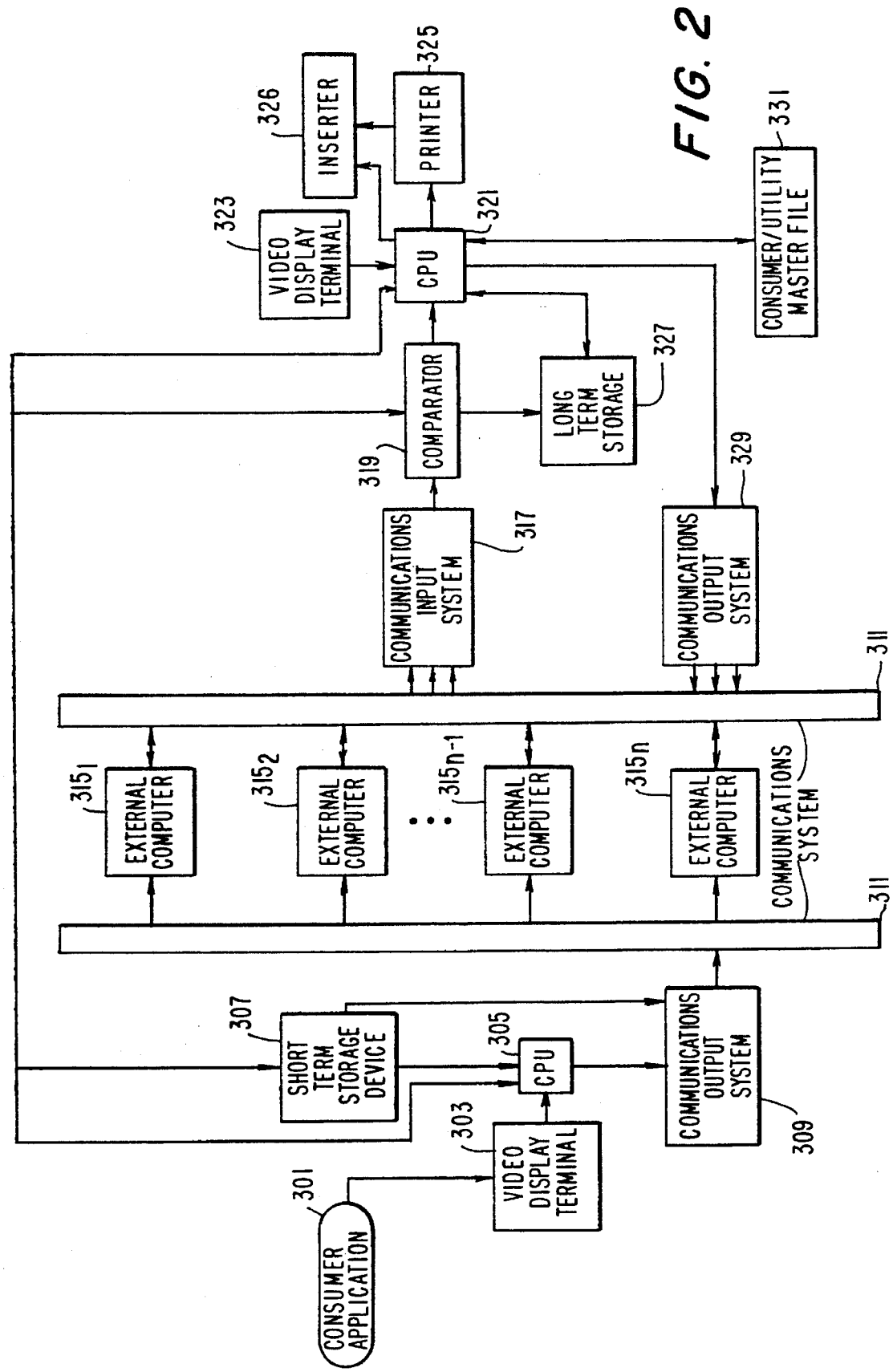
FIG. 2 is a block diagram emphasizing data flow of the customer enrollment subsystem.

Reference is next made to FIG. 2, wherein the enrollment process is described in more detail. The process begins with the consumer completing an application form 301. A data entry phase is then completed by a video display terminal operator entering the consumer application data from 301 into CPU 305 via video display terminal 303. CPU 305 is electrically connected to a short term storage device 307 and a communications output system 309. Short term storage devise 307 is also electrically coupled to communications output system 309. As a result, information from the consumer application 301 that has been inputted by video display terminal 303 is stored on the short term storage device 307 and is output through communications output system 309.

Communications output system 309 is coupled to a communications system 311. Communications output system 309 includes at least one communications manager and some type of electrical connection device, such as a modem, as similarly shown in FIG. 1. The communications system 311 can be any conventional networking system, such as a telephone system or cable system.

Communications system 311 links the communications output system 309 to external computers $315_1$–$315_n$. The external computers similar to those shown in FIG. 1 as utility computer systems 200. These external computer $315_1$ include processing ability such as a CPU, memory such as RAM and communication ability such as a communications manager and modem.

External computers $315_1$–$315_n$ receive data from communications output system 309 via communications system 311. The data is processed and an output is provided to communications input system 317 via communications system 311. In other words, external computers $315_1$–$316_n$ are electrically connected to the communications system 311 and the communications system 311 is electrically connected to the communications input system 317. The communications input system 317 is in turn electrically connected to a comparator 319 for company information in short term storage device 307 with the information received from external computers $315_1$–$315_n$. Comparator 319 is, for example, a comparator, or other electronic device capable of comparing two sets of information to determine commonality. Comparator 319 is also electrically connected to CPU 321. CPU 321 is provided for generating a credit analysis of the consumer or applicant. CPU 321 is also electrically connected to video display terminal 323, printer 325, inserter 326, long term storage 327, communications output system 329 and consumer/utility master file 331.

In operation, comparator 319 receives information from short term storage device 307 and communications input system 317 and determines when common data is received from both elements and transmits an appropriate signal to CPU 321. CPU 321 also receives information from short term storage device 307 and information is input from a video display terminal 323. CPU 321 generates a credit profile of the applicant in response to the information received. This credit information is transferred to long term storage 327 and consumer/utility master file 331. Alternatively, if information identified in comparator 319 indicates that there are conflicts between short term storage device 307 and communications input system 317, then CPU 321 outputs a signal to communications output system 329. This signal causes CPU 321 to recommunicate with external computers $315_1$–$315_n$ and determine whether an error was received during transmission of information. If the inconsistencies determined by comparator 319 cannot be rectified, CPU 321 notifies the consumer; by example, by printing out a letter to the consumer and/or notifying the appropriate company external computer $315_1$–$315_n$ to rectify the situation. When the information is received, it is entered through video display terminal 323 into CPU 321 and stored in long term storage 327. The consumer/utility master file 331 is also updated. Once all information is correctly received and analyzed, CPU 321 causes an electronic statement message or form letter, etc. to be transmitted to the consumer. For example, printer 325 may generate a form letter accepting or denying consumer application 301. The letter is automatically inserted into an envelope for mailing by inserter 326.

After being enrolled, customer data is input into the central processing computer system as described above with regard to FIG. 2. If information or data is missing on a particular customer, either the customer or the utility is contacted in order that a complete set of data may be inputted. As shown in the FIG. 3 flow diagram, once customer data has been fully inputted, central processing notifies the companies and utilities (11) that have been selected by the customer for bill consolidation under the system. The company or utility is also requested to provide a billing and payment history of the customer.

Figure 3:
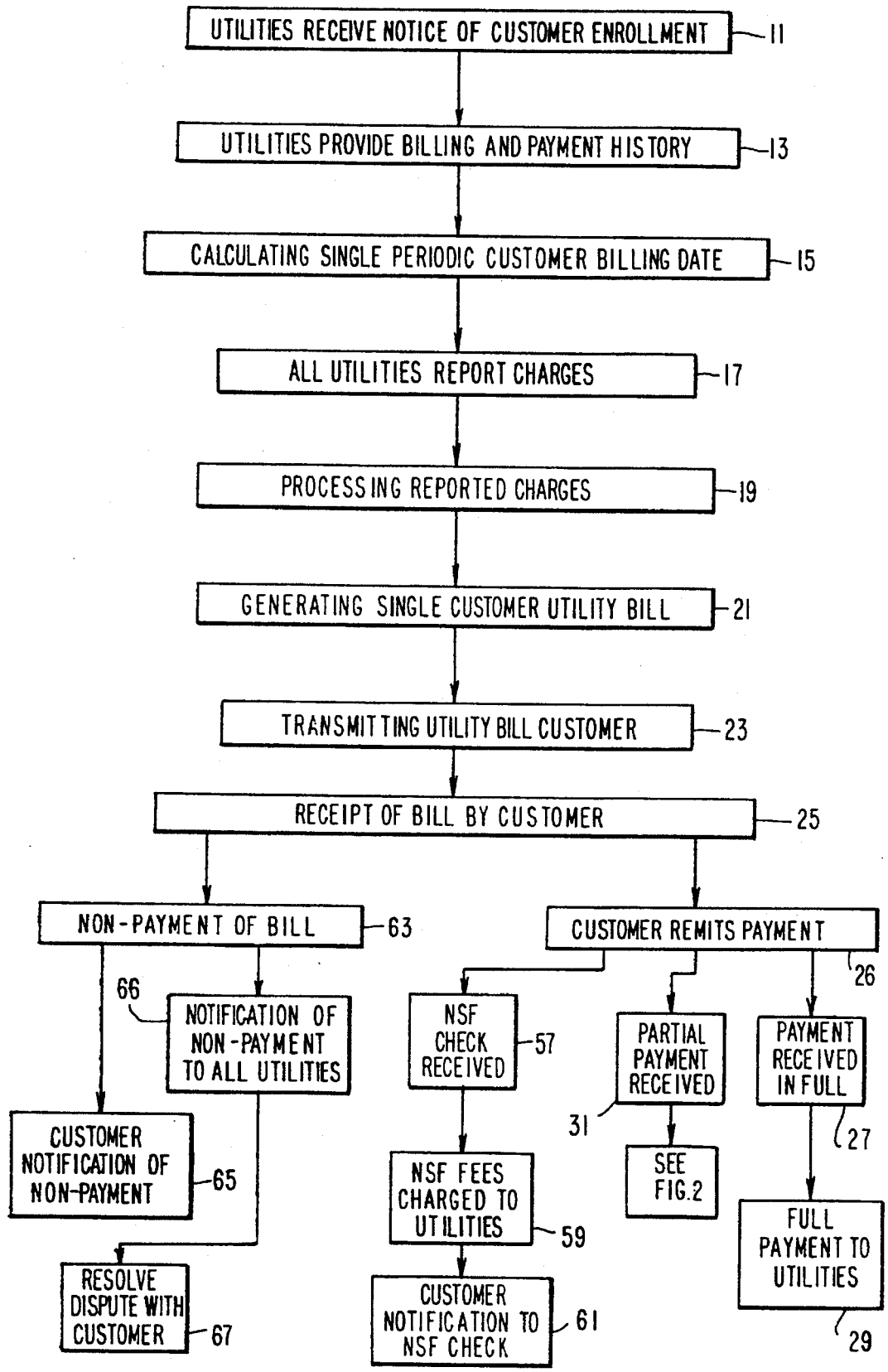
FIG. 3 is a flow diagram representative of the consolidated billing and payment system of the present invention.

Continuing with the flow diagram of FIG. 3, after receiving the billing and payment histories of the customer from each of the companies and utilities (13), the data therefrom is analyzed via a software program in order to determine an optimal billing date for the customer. In particular, the optimal periodic billing date is calculated (15) utilizing a minimization modeling process as is well known in the art in order to minimize the compensatory payments to the companies and utilities, as discussed hereinafter. The modeling process takes into account the periodic billing and payment due dates of each company and utility for the customer as well as the average dollar value charged by each company and utility during a billing cycle. Alternatively, the modeling process may have an override feature to allow the consumer, utility or financial institution to select the billing and/or payment due dates.

Once the optimal billing date is determined, the customer is sent confirmation of participation in the billing system by the financial firm, and is also advised of the new billing cycle based on the optimal billing date that was determined. In addition, the companies and utilities of the customer are also advised of the optimal billing date that will be used for the customer.

Once customer enrollment and account set up have been completed, as described hereinabove, the financial firm can then commence operation of the consolidated billing system for the customer. In particular, and continuing with FIG. 3, once a company or utility billing cycle is completed, and the customer charge for that company and utility is determined, the company and utility charges are reported to the financial firm (17). This data is retained in storage at central processing until all billing information of the customer is received from the companies and utilities during a billing cycle. Then, the reported charges of the companies and utilities are processed (19) and a single customer billing statement is generated (21). As shown in FIG. 7, the statement identifies each of the companies and utilities which have rendered charges, the charges for the particular billing cycle, and the total amount due for payment by the customer (77). In addition, the statement (summary of account) may also include the payment status for each utility as well as the charges of the company or utility for previous months. The statement will also include a remittance stub (79) which is selectively detachable from the remainder of the statement along a perforated fold. As discussed in greater detail below, the remittance stub is returned with the customer's payment to the financial firm.

As illustrated on the statement depicted in FIG. 7, the statement also includes a payment due date (81). After the statement is sent to the customer (step 23 in FIG. 1), the customer has until the due date to pay the charge (77) identified on the statement without incurring any penalty. The payment period begins on the date the statement is produced and/or sent to the customer. Typically, the payment due date on the statement is between 15 and 30 days after the date the statement is transmitted to the customer.

The statement may be transmitted to the customer along with replicated billing information or copies of individual statements or invoices from the companies and utilities. These company and utility statements or invoices may be presented in various types of formats, including a four part (quadrant form) reprint of the bills on a single sheet. In addition, informational and promotional enclosures ("inserts") may also be transmitted along with the customer statement. These and other items which may or may not be enclosed with the customer statement are pre-selected by the customer when the customer signs up with the financial firm to participate in the consolidated billing system. Therefore, if a customer does not want copies of the individual company and utility bills, or the customer does not want copies of non-required informational and promotional inserts, he or she may select to do so.

Referring again to the FIG. 3 flow diagram, once the customer receives his or her consolidated billing statement (25), the customer has until the payment due date indicated on the statement to remit payment of the charges indicated thereon. Remittance may be accomplished by check, direct debit, pay-by-phone or electronic transfer via computer. When any payment is remitted by a customer (26), it must then be determined if full or partial payment has been received. If the customer remits full payment (or for that matter partial payment) to the financial firm in order to meet the payment due date (27), the financial firm processes the payment (and the enclosed stub). The payment (typically a check) is deposited into a financial bank and the financial firm may wait for clearance of the funds from the bank identified on the customer's check. Alternatively, the financial firm may transfer deposits via automatic clearing house (ACH) transfers or other means prior to the funds being cleared. If the funds are cleared, the funds could be transmitted by electronic mail or via check or other means to the various companies and utilities (29).

Simultaneously, when full payment is received, the utilities are notified and the customer's account with the companies and utilities is noted as paid.

Figure 4:
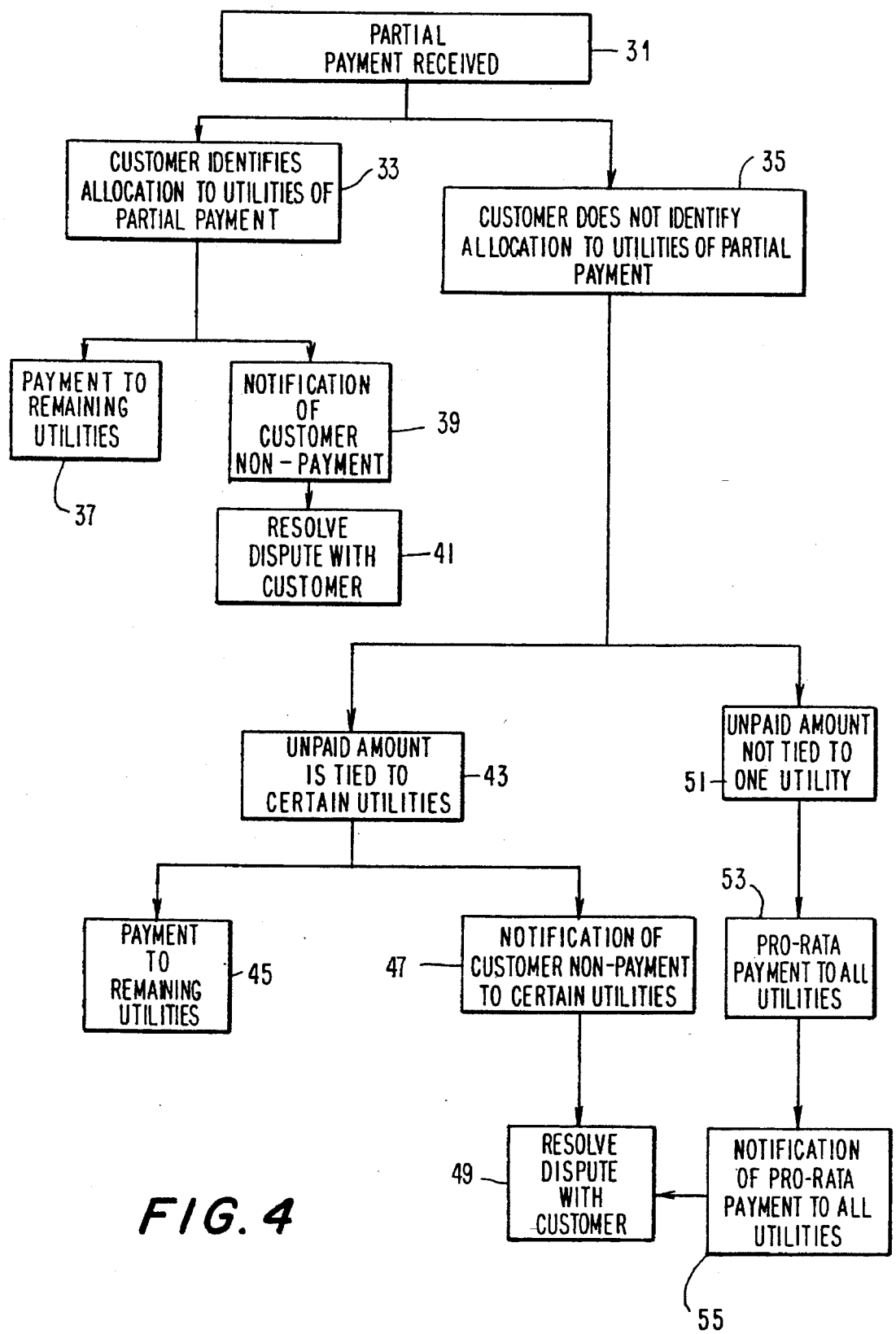
FIG. 4 is a flow diagram which branches from FIG. 1 and which is representative of the partial payment portion of the consolidated billing system in accordance with the present invention.

In some situations, the customer will only remit a partial payment of the charges reflected in the customer statement by the payment due date (31). In this situation, as illustrated in the flow diagram of FIG. 4, there are two possibilities: (i) the customer has identified allocation of partial payment to the utilities (33), or (ii) the customer has not identified allocation of his or her partial payment (35). In the situation where the customer has identified allocation of payment, the utilities which are designated for payment are sent notification of full payment and payments received via ACH or other means (37), and the customer's account at the companies and utilities is credited appropriately. With respect to those utilities which are not designated for payment, or which have only been partially paid, the utility receives notification of non-payment or partial payment (39). In addition, the customer may receive notification from either the financial firm or the utility and other companies. Furthermore, customer service system (41) may be used in order to resolve the billing dispute with the customer.

In some situations, the customer will remit only partial payment (see FIG. 4), but does not identify the allocation of that payment to the companies and utilities (35). If the non-payment can be tied to certain utilities (43), then those companies and utilities which are to be paid receive funds (45) in the manner described above. A clear example where non-payment of a portion of the statement can be tied to a particular utility can easily be demonstrated in conjunction with the dollar values shown on the summary of account in FIG. 7. If we assume that the customer submits payment in the amount of $260.09, which is $25.42 less than the $285.51 total due, it can be assumed that the customer withheld the $25.42 billed (76) from AT&T. With respect to those companies and utilities for which there is either partial payment or non-payment, the utility receives notification (47) and the company or utility may utilize customer service in order to resolve the billing dispute (49).

Still referring to FIG. 7, if the customer instead remits $271.71, which is $13.80 less than the $285.51 total due, it can be assumed that the customer withheld the Past Due portion of the bill which is $261.22 less $247.42, or $13.80 that was owed for payment of the previous month's Bell Telephone Company charge (75). In this instance, it is clear that customer intends to pay all current charges, but disputes a past charge.

If the paid or unpaid amount cannot be tied to any particular company or utility (51), then the financial firm will remit to all the companies and utilities a pro-rata (percentage) payment (53) based on the partial payment. Simultaneously, all companies and utilities are notified of the pro-rata payment (55) after which customer service may be used in order to resolve the billing dispute (49).

In certain situations and continuing with FIG. 3, the customer will remit payment to the financial firm by check for either the full or a partial amount, but the check will not receive clearance from the customer's bank (57). This situation is known as receipt of an NSF (non-sufficient funds) check. In this situation, the NSF charge incurred by the financial firm is passed onto the companies and utilities (59) or onto the customer. Depending upon how the system is managed, the financial firm may attempt to redeposit the check to see if sufficient funds have been placed in the bank. If the check comes back NSF again, an additional assessment may be made to the companies/utilities and/or the customer. The customer may be sent the NSF check either by the financial firm or the company/utility with a notation that an NSF fee has been charged to its account (61).

In the situation where the customer does not transmit any payment to the financial firm (63), the companies and utilities are also notified (66). The customer is notified of nonpayment (65) and the companies and utilities may then attempt to resolve the dispute or problem with the customer using customer service (67).

As discussed above, using the consolidated billing system, all bills are due for payment by a single statement due date. However, because the billing cycles of individual companies vary (are not synchronized), at least some of the companies and utilities are scheduled to receive payment at a date later than they otherwise would if the company or utility billed the customer individually.

For example, assuming a 30 day month, customer A is billed by three different utilities on a monthly basis as follows:

| UTILITY | BILLING DATE | PAYMENT DUE DATE | BILLING CYCLE |
| --- | --- | --- | --- |
| Electric | 5th of first month | 25th of first month | 20 days |
| Water | 2nd of first month | 22nd of first month | 20 days |
| Gas | 10th of first month | 10th of second month | 30 days |

As the above chart reveals, these companies or utilities have varying billing and payment cycles.

In accordance with the inventive consolidated billing system, a single periodic customer billing date is selected. For the above example, let us presume that the selected single periodic statement billing date is the 10th day of the first month and that the payment due date reflected on the consolidated statement is the 25th day of the first month (a 15 day billing cycle under the inventive system). Therefore, for the water company, it would receive payment later than it would otherwise if it was handling the billing and remittance itself. Due to this extended period ("float"), the water company would be losing monetary interest if it "signed up" with the consolidating billing system. Specifically, the water company would be losing monetary interest between the 22nd of the first month and the 25th of the first month (3 days).

Therefore, in accordance with the inventive consolidated billing system, the impact to the financial firm is assessed through the fee structure of the water company. The water company is compensated for the monetary interest lost due to the 3 day "float" period.

With respect to the gas company charge, since the gas company charge would not be due for payment to the gas company until the 10th of the second month, a date after the single periodic statement due date (25th day of the first month), a "float" or interest payment may instead be due by the gas company to the financial firm. This is because the gas company would be receiving payment earlier than it would otherwise receive payment if it handled the billing and remittance itself. In particular, the gas company would be gaining monetary interest between the 25th day of the first month and the 10th day of the second month (15 days).

Therefore, in accordance with the inventive consolidated billing system, the gas company may be assessed by the financial firm for the monetary interest gained during its float period. In a preferred method for carrying out the system, the charge is assessed to the gas company by deducting the charge from the amount paid by the financial firm to the gas company.

Finally, with respect to the electric company, no compensatory payment or charge is required since the consolidated statement payment due date under the system is the same as the payment due date of the electric company if it handled billing and remittance itself.

Figure 5:
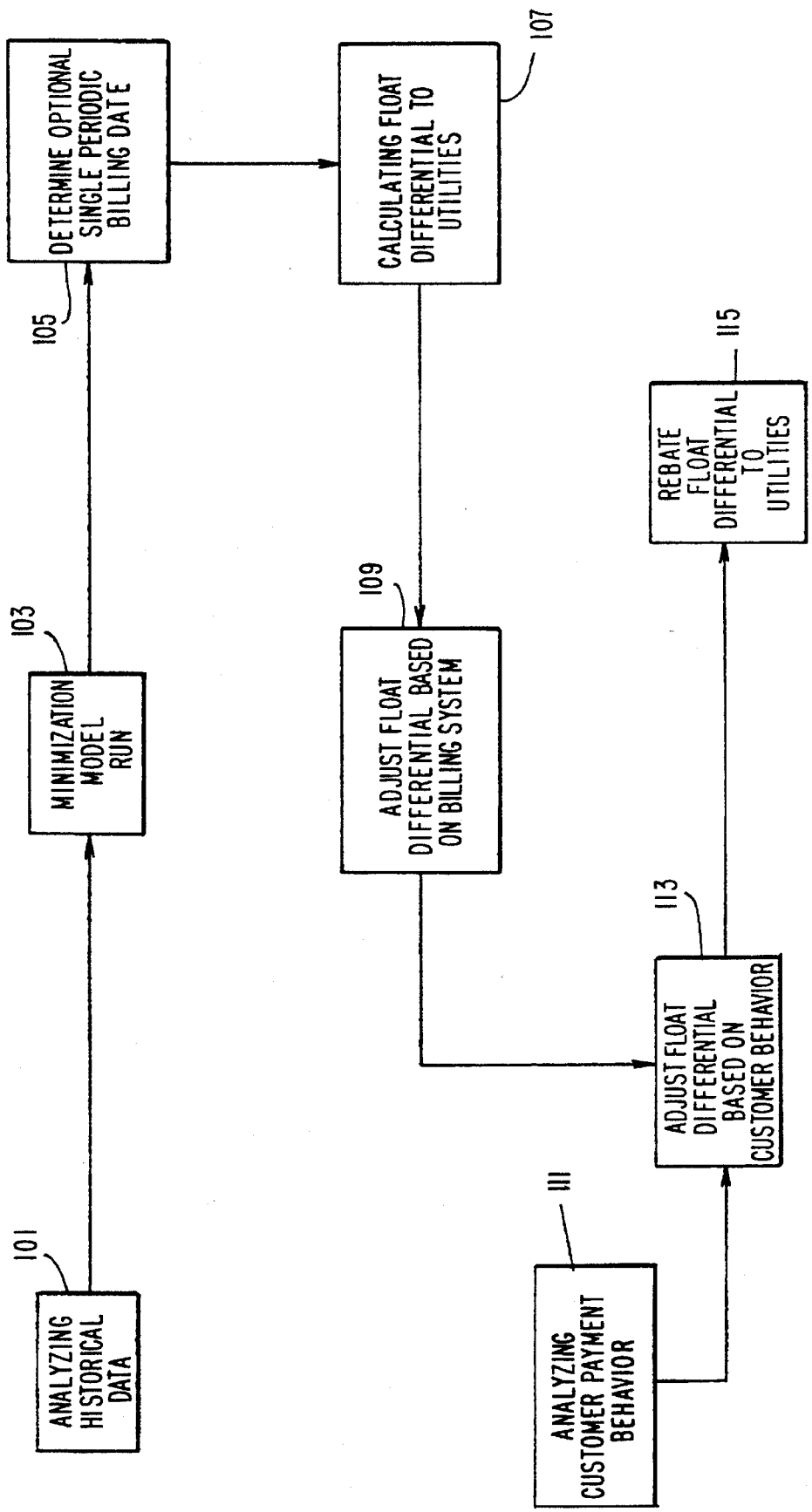
FIG. 5 is a flow diagram representing the compensation portion of the consolidated billing system of the present invention.

As discussed above, and with reference to the flow diagram of FIG. 5, it is preferable to determine or calculate the single periodic customer billing date for the company and utility charges that are incurred by the customer in order to minimize the overall compensatory payment or "float" payment rebated to the group of companies and utilities. This is achieved by analyzing historical customer billing data (101) that is initially supplied by the utilities to the financial firm. Specific factors which are evaluated include the number of days between periodic customer billings by the utilities, the average charges of each of the utilities to the customer and the frequency of billings to the customer by individual utilities. A standard minimization analysis is then performed (103), as is known to one of ordinary skill in the art, which considers one or more of the factors.

Based on the results of the minimization analysis or run, the financial firm determines an optimal single periodic customer billing date (105). A payment due date (81) is then chosen, which is a fixed time period in the billing cycle after the billing date. Once the due date is selected (printed on the consolidated statement depicted in FIG. 7), the financial firm can then calculate the differential interest payment (107) payable each cycle to the utilities, as discussed before.

As described before, the companies and utilities are compensated for the monetary interest lost due to the time difference between the statement due date and the periodic customer payment due dates of the individual utilities (115). Under the inventive system, compensation to the companies may be enhanced by the financial firm to compensate for the additional time required for processing periodic billing information from the utility charges reported by the utilities and processing payments received from the customer (109).

In particular, since the bill consolidating system of the invention utilizes a central (or a regional) processing center or facility, the time between transmitting the single customer billing statement and receipt of the statement by the customer may be longer than if these steps were done by the local company or utility individually. Similarly, the time between remittance of payment from the customer and the time the utility has received the funds from the central or regional financial processing center may be longer than if the company or utility acted on its own. Therefore, the financial firm may elect to enhance the compensatory payment to the companies and utilities in order to compensate them for the monetary interest lost due to the additional time needed to receive available funds based on customer remittance of payment. If instead a compensatory payment is owed to the financial firm, the charge assessed the company or utility is reduced appropriately.

Moreover, once the consolidated billing system is in place for a particular customer, the financial firm may periodically monitor and evaluate the payment behavior patterns of the customer (111). In some instances, it may be determined that on average a customer pays more promptly because of receipt of a single periodic customer utility statement than if he or she received different periodic customer billing statements from the individual utilities. This is because the customer is required to spend far less time and effort in order to remit payment of periodic company bills.

Conversely, the opposite may be true, and the behavior pattern of the customer may indicate a tendency on average to remit payment later when he or she receives a single periodic customer utility statement as compared to receipt of different periodic customer billing statements from individual utilities. Since the charge of the consolidated statement is significantly larger than individual company charges, the customer may wait until the very last day on which to remit payment in order to maximize interest earned in his or her bank account.

Depending on the results of this evaluation, the compensatory ("float") payment to each of the companies and utilities may be selectively and periodically adjusted in response to customer behavior patterns (113) and based on negotiations between the various utilities and the financial firm.

In particular, if the customer pays more promptly, any compensatory payment due to the companies or utilities may be decreased. Alternatively, in the same situation, any payment owed to the financial firm may be enhanced.

On the other hand, if the customer pays less promptly, any compensatory payment due to the companies may be increased. Moreover, in the same situation, any payment owed to the financial firm may be reduced.

As discussed hereinbefore, use of the consolidated billing system of the invention is advantageous to the customer, the individual utilities and the financial firm implementing the consolidated billing system. For the customer, instead of receiving several different periodic customer billing statements, the customer receives only a single consolidated statement over a given cycle period. The single statement is more manageable and provides summary information not available to customers by any other type of billing system. In addition, from a financial standpoint, only a single postage payment is required to remit payment for all of the utility charges, instead of the several stamps that are usually required for individual utility payments. Furthermore, only a single check or money order is required, further reducing the expense to the customer as well as increasing customer convenience. Another advantage which may be offered to individual customers is the ability to change a mailing address or shut off utility services on a particular date by making a single phone call to the financial firm which would then handle such matters.

Individual utilities will also save money by enrolling in the bill consolidating system of the invention. Current costs for mailing a bill or statement are presently averaged to be about 45¢. This includes variable expenses for postage, materials, handling and processing. Moreover, the cost for remittance processing is estimated at present to be about 18¢ per billing. This cost includes variable expenses for bill opening, statement and stub matching, handling and sorting. By using the consolidated billing system of the invention, the financial firm can provide the same bill mailing service for an estimated 30¢ per bill and the same remittance service for an estimated 6¢ per household bill. This represents a significant savings to the individual utilities. It also frees the utilities to concentrate on servicing the customer. In short, there is both financial and practical savings to the individual utility. Moreover, any reluctance on the part of utilities based on a delay in receiving their funds is eliminated by the compensation aspect of the present invention.

The consolidated billing system benefits the financial firm as well since it will create a source of income by charging the utilities a fee which will earn them a profit while still providing a cost savings to the utilities which will reduce the need to engage in billing matters. The financial firm already has appropriate billing procedures and personnel in place to handle billing and payment matters.

As alluded to above in connection with the running of a minimization program, the system is best implemented by means of computer technology. Data such as historical customer billing data and periodic billing information reported by each of the utilities is forwarded to the central processing office or facility by means of electronic transmissions or periodically supplied data discs, tapes or other means. The particular configuration of the software programs which run on a central processing unit (CPU) of the financial firm to perform various mathematical calculations, such as determining a single periodic customer billing date, are individually outside the scope of this invention. The equations for such calculations and the various hardware CPU's and memory devices which can be implemented are each individually well known in the art. Moreover, the unique combination of elements described below are the subject of this invention.

Figure 6:
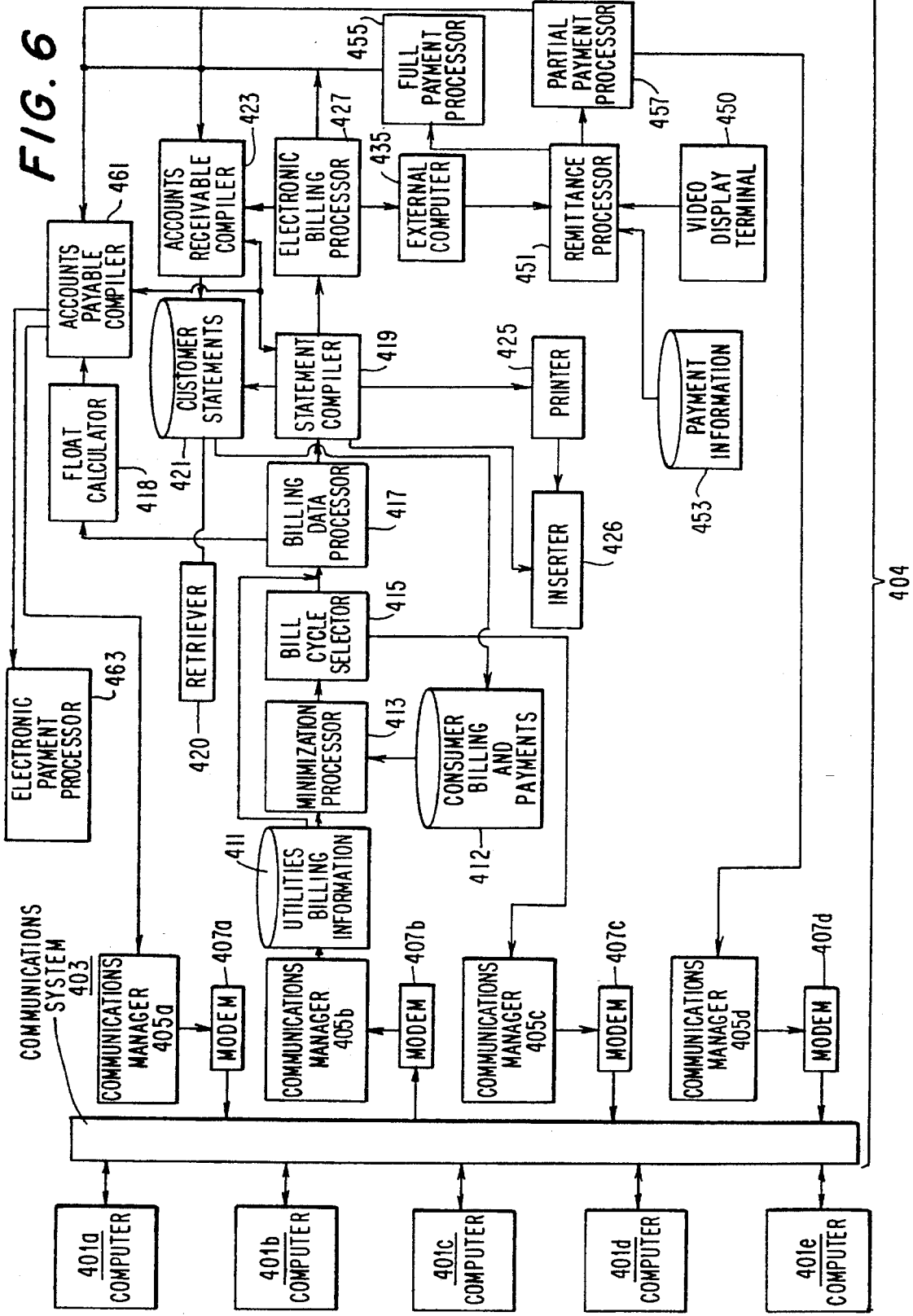
FIG. 6 is a block diagram of an alternative preferred embodiment of the invention including a plurality of processing subsystems and emphasizing data flow of the daily operation of the system.

Reference is now made to FIG. 6, which is a block diagram emphasizing the data flow of one preferred embodiment of the invention. The diagram depicts a plurality of external (utilities) computers 401a–e which are electrically coupled to a communications system 403 via a normal computer link. Communications system 403 is also coupled to a financial institution computer system, generally indicated at 404. During the daily operation of the computer system information is exchanged between the utilities and the financial institution via the communications system 403. The data flow diagram illustrates operations of the automated billing consolidation system software which is executed by at least one central processing unit. The software causes the printer 425 to print out invoices and the electronic payment processor to pay the utilities. Boxes on the diagram represent program modules (portions driven by software) while cylinders indicate data elements (stored information). The arrows between boxes and cylinders indicate the directions of data flow.

External computers 401a–e include communications managers, storage devices and modem hookups, as well known in the art, in order to allow each external computer 401a–e to communicate with other computers hooked up to communications system 403. Each external computer 401a–e represents the individual computer of one of the utilities that is enrolled in the program.

The home base, or financial institution billing department computer system is generally indicated at 404. This system includes a plurality of communications managers 405a–d. Each communications manager 405a–d is electrically coupled to a modem 407a–e and each modem is in turn coupled to communications system 403. Accordingly, communications managers 405a–d are in selective communication with external computers 401a–e and receive information therefrom and transmit information thereto. In an alternative embodiment, data transfer can be achieved by external computers 401a–e downloading the appropriate data to conventional disc or tape memory and sending the disk or tape memory to the financial firm for input into the financial firm computer.

As shown in FIG. 6, communications manager 405b is coupled to utilities billing 411 which is in turn coupled to minimization processor 413. Minimization processor 413 performs a minimization modeling process as well known in the art. Minimization processor 413 is also coupled to consumer billing and payments file 412. Minimization processor 413 communicates with a billing cycle selector 415. Billing cycle selector 415 is coupled to communications manager 407c. Accordingly, utilities billing information 411 and consumer billings and payment information 412 are input into minimization processor 413 and the output therefrom is input into billing cycle selector 415. Billing cycle selector 415 then determines an appropriate billing date which is output to communications manager 405c for transmission back to the utilities, as described with respect to FIG. 1.

Billing cycle selector 415 is coupled to a billing data processor 417. Billing data processor 417 is coupled to and receives data from utilities billing information 411 and outputs data to float calculator 418. Billing data processor 417 outputs a signal to statement compiler 419 which then outputs statement information to customer statements 421. Statement compiler 419 also outputs statement information to accounts receivable compiler 423. Accounts receivable compiler 423 is coupled to customer statements 421 which is also coupled to consumer billing and payments 412.

The statement information compiled in statement compiler 419 is received in accounts receivable compiler 423 and stored in customer statements 421. Retriever 420 is also coupled to customer statements 420 and retrieves customer billing and payment history. Consumer billing and payments file 412 is coupled to customer statements 421 and is updated periodically. Statement compiler 419 is coupled to a printer 425 for generating a hard copy of the statement. This statement is inserted into an appropriate envelope by inserter 426 and delivered to the postal service. The consumer will then receive the bill and remit payment.

Alternatively, statement compiler 419 is coupled to electronic billing processor 427 which is in turn coupled to external computer 435, such that bill payment is made available by wire transfer. Electronic billing processor 427 accesses external computer 435 to coordinate monetary transfer. Electronic billing processor 427 is also coupled to accounts receivable compiler 423 to update the payment of the receivable.

If payment is made by the normal method of mailing a check to the financial institution along with stub 79 (See FIG. 7), payment information is entered into video display terminal 450 which is coupled to remittance processor 451 which in turn is coupled to payment information file 453. Remittance processor 451 determines whether there is full payment or partial payment. In the event full payment is received, remittance processor 451 sends an appropriate electrical signal to full payment processor 455.

If only partial payment is received, remittance processor 451 sends an appropriate electronic signal to partial payment processor 457. As described hereinabove, if partial payment is received, partial payment processor 457 undergoes the steps shown in FIG. 4.

If there is non-payment of the bills, an appropriate signal is transferred to communications manager 405d for transmitting the appropriate information to the utilities.

Full payment processor 455 and partial payment processor 457 are both coupled to accounts receivable compiler 423 and accounts payable compiler 461. As described above, accounts receivable compiler 423 updates the accounts receivable and outputs a signal to customer statements file 421. The information stored in customer statements file 421 is used to update consumer billing and payments file 412. Accounts payable compiler 461 is coupled to float calculator 418 which is in turn coupled to billing data processor 417.

Referring now to FIGS. 3 and 6, billing data processor 417 provides an input to float calculator 418 so float calculator 418 can determine the float or compensatory payment to be given to the appropriate utilities. Accounts payable compiler 461 receives the float calculation from float calculator 418 and receives the payment information from payment processors 455 and 457. Accounts payable compiler 461 then activates the electronic payment processor 463 and communications manager 405a.

Accounts payable compiler 461 is responsible for remitting payment to the utilities by an electronic payment processor 463. Accounts payable compiler 461 also communicates payment information to the utilities via communications manager 405a transmitting the information over communications system 403 to external computers 401a–e. As can be seen, the system shown in FIG. 6 is responsible for carrying out the steps of the process shown in FIGS. 3–5.

Based upon evolving customer payment patterns, processing turnarounds, etc., the computer hardware runs the same software programs to periodically update customer billing dates, statement due dates, etc. The data gathered by the financial firm optionally may be used to establish budget payments by the customers based on past utility uses. For instance, in a very simplified example such as a levelized payment plan, if a customer's electric bill equals $30 per month for each of the first six months of the year and $90 per month for the last six months of the year, the financial firm can implement a budget payment plan wherein the customer remits a $60 payment each month. Upward or downward adjustments can be made annually to balance the individual account.

The inventive system and method is for companies and utilities whose monthly or periodic billing cycles are not synchronized—in other words, the companies and utilities are not related to each other and therefore have different payment and billing cycles which require appropriate adjustment. What the invention does is to enable the consolidation of the individual charges from the various unrelated companies and bring them together without altering the billing cycles of the companies and utilities. Under the system, a single customer billing date is chosen for the charges incurred by any customer of all of the companies and utilities, and a single customer statement identifying all the company charges is forwarded to the customer.

Referring particularly to FIG. 7, the statement lists six unrelated utilities, the service of each being unique. Under the system, the charges reported by the various utility companies are processed and the amount owed or due each utility during the utility's individual service period is printed on the right-most column of the statement. The service periods are all different. The statement is forwarded to the customer on or about the customer billing date, which is a date after the last date of the service period of each of the identified utilities.

Thus, under the system, time displacement essentially takes place so that a single consolidated statement can be generated for the charges of the companies and utilities whose monthly or periodic billing cycles are not synchronized. Through financial manipulation, multiple unsynchronized billing cycles of utilities are consolidated into a single periodically predictable statement. This enables the customer to process and remit payment to the various companies at one time during any given month or cycle. This of course is a far more efficient system for payment remittance than is found in the prior art. This further presents a huge advantage to the customer, who, instead of receiving several different periodic customer billing statements from the various unrelated companies, receives only a single consolidated statement over any given cycle period. This further presents a distinct advantage to the utilities who receive payment information at one time, thereby simplifying the billing process.

It will thus be seen that the objects set forth above, among those made apparent from the preceding description, are efficiently attained and, since certain changes may be made in carrying out the above process and in the system set forth without departing from the spirit and scope of the invention, it is intended that all matter contained in the description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

I claim:

1. A data processing system for consolidating a plurality of individual charges from a plurality of unrelated companies for a customer whose periodic billing cycles are not synchronized, each said individual charge having associated therewith a different periodic individual company billing date and a different periodic individual company payment due date, the system comprising:
   (a) means for receiving and processing said plurality of individual charges reported to said data processing system by one of electronic and magnetic communication from said companies;
   (b) means responsive to said receiving and processing means (a) for periodically generating a statement payment due date;
   (c) float calculating means for computing, for each company: i) a compensatory assessment if said statement payment due date is later than the individual company payment due date; and ii) a charge payment if said individual company payment due date is later than said statement due date;
   (d) minimization processing means for calculating an optimal statement payment due date in order to minimize said compensatory assessments;
   (e) means responsive to said minimization processing means for generating a customer statement which identifies all individual company charges and said optimal statement payment due date and forwarding said customer statement to the customer on a periodically selected statement billing date;
   (f) remittance processing means for processing payment received from said customer for at least some of the charges identified on said customer statement; and,
   (g) remuneration means for computing, allocating, and transmitting remuneration to those of said companies for at least some of whom payment was received.

2. The system of claim 1, further including data processing means for analyzing historical customer billing data reported by each of the companies.

3. The system of claim 1, further including data inputting and processing means for evaluating payment behavior patterns of at least one customer in order to selectively adjust said compensatory assessments.

4. An automated method for consolidating a plurality of individual charges from a plurality of unrelated companies for customers whose periodic billing cycles are not synchronized, said individual charges having different periodic individual company billing dates and different individual company payment due dates, the method comprising the steps of:
   a. storing said plurality of charges from said plurality of companies in a memory device;
   b. selecting a single statement billing date for charges incurred by the customer;
   c. electronically processing billing data information from the charges reported by said companies;
   d. periodically generating a customer statement which identifies all individual company charges and a statement payment due date;
   e. determining, for each company: a compensatory assessment if said statement payment due date is later than said individual company payment due date; and a charge payment if said individual company payment due date is later than said statement payment due date;
   f. calculating an optimal statement billing date for said customer incurred charges in order to minimize said compensatory payments;
   g. transmitting said customer statement to said customer on said optimal statement billing date;
   h. electronically processing payment received from said customer for at least some charges identified on said transmitted customer statement; and,
   i. computing, allocating, and transmitting remuneration to those of said companies for at least some of whose charges payment was received.

5. The method of claim 4, wherein said selecting step (b) includes analyzing historical customer billing data reported by each of said companies.

6. The method of claim 4, wherein said step (e) includes increasing said compensatory assessment for each of said companies due to the time required for step (c) and step (h).

7. The method of claim 4, wherein step (h) includes reducing said compensatory charge payment for each of said companies due to the time required for step (c) and step (f).

8. The method of claim 4, further including the step of:
   (j) evaluating payment behavior patterns of said customer after receiving customer payments over multiple time periods.

9. The method of claim 8, further including the step of:
   (k) adjusting said compensatory assessment and said compensatory charge payment for each of said companies based on said evaluating step.

10. The method of claim 4, wherein step (c) includes calculating a total customer charge based on the charges reported by each of said companies.

11. The method of claim 10, wherein said statement produced by step (d) identifies said total customer charge.

12. The method of claim 4, wherein said statement produced by step (d) identifies a telephone number for customer service.

13. The method of claim 4, further including the step of forwarding at least one periodic individual company invoice along with said periodic customer statement.

14. The method of claim 4, further including the step of forwarding one or more informational or promotional inserts along with said periodic customer statement.

15. The method of claim 4, wherein said periodic customer statement includes a customer retaining portion which identifies said charges and a customer remitting stub.

16. The method of claim 15, wherein said step (h) includes processing said remitting stub received from said customer.

17. The method of claim 15 wherein said step (h) includes processing partial payment for the charges identified in said customer statement.

18. The method of claim 17, wherein said remitting stub identifies allocation of said partial payment to said companies.

19. The method of claim 18, wherein said step (i) comprises allocating and sending partial remuneration to the companies.

20. The method of claim 19, further including the step of notifying to each company to which full remuneration payment has not been remitted of said partial remuneration.

21. The method of claim 17, wherein said remitting stub does not identify allocation of said partial payment to said companies.

22. The method of claim 21, wherein said step (i) comprises allocating partial pro-rata remuneration to each of said companies.

23. The method of claim 22, further including the step of notifying each company of said partial pro-rata remuneration.

24. The method of claim 4, wherein said step (h) comprises processing payment for all the charges identified in said customer statement.

25. An automated system for consolidating a plurality of individual charges from a plurality of unrelated companies for a customer, said individual charges having different periodic individual company billing dates and different individual company payment due dates, the system comprising:

a) electronic processing means for computing a single statement billing date for the charges incurred by the customer;

b) electronic data communication means for receiving and processing periodic billing information from the charges electronically reported by said companies;

c) means, responsive to said data communication means, for generating a periodic customer statement which identifies all individual company charges and a statement payment due date and for transmitting said periodic customer statement to said customer;

d) electronic processing means for processing payment received from said customer for at least some of the charges identified on said transmitted customer statement;

e) allocating means for allocating and transmitting remuneration to at least some of said companies corresponding to the payment received; and f) electronic computing means for calculating, for each company: i) a compensatory assessment if said statement payment due date is later than the individual company payment due date; and ii) a charge payment if said individual company payment due date is later than said statement payment due date;

wherein said electronic processing means (a) includes computing means for calculating an optimal statement billing date for said [customer incurred charges] periodic customer statement in order to minimize said compensatory assessments.

26. The system of claim 25, wherein said electronic processing means (a) includes analyzing means for analyzing historical customer billing data reported by each of said companies.

27. The system of claim 25, further including data inputting and processing means for evaluating payment behavior patterns of said customer in order to adjust said compensatory payments.

28. The system of claim 25, further including means for electronically storing data representing customer payment history.

29. The system of claim 25, further including electronic means for comparing the total customer charges in said customer statement to a value calculated in the electronic processing means, said electronic comparing means determining if partial payment or complete payment was made.

30. The system of claim 29, said electronic comparing means determining whether any of said company bills are not paid.

* * * * *